UNITED STATES PATENT OFFICE.

ARTHUR HASWELL AND JOHN C. LONG, OF WEBSTER CITY, IOWA.

IMPROVEMENT IN TANNING COMPOUNDS.

Specification forming part of Letters Patent No. 163,191, dated May 11, 1865; application filed March 6, 1875.

*To all whom it may concern:*

Be it known that we, A. HASWELL and J. C. LONG, of Webster City, in the county of Hamilton and State of Iowa, have invented certain new and useful Improvements in Tanning Compounds; and we do hereby declare that the following is a full, clear, and exact description thereof, which will enable others skilled in the art to which it pertains to make and use the same.

The nature of our compound will be readily understood from the following description and claim: Put one hundred pounds (100 lbs.) of sumach in a tank or barrel, or other vessel, pour boiling water thereon till covered, or cold water, and heat the same in any known way, and let it stand twenty-four hours. Then strain into a vat. Next dissolve fifty pounds (50 lbs.) of japonica in any suitable vessel by pouring hot water thereon, or otherwise, and put in with the sumach. Pour water into the vat till three-quarters full. Add half ($\frac{1}{2}$) bushel of salt, twelve pounds (12 lbs.) sal-soda dissolved, ten pounds (10 lbs.) oil of vitriol, five pounds (5 lbs.) spirits of turpentine, and one pound (1 lb.) potash, dissolved. After the hides have been properly bated, plunge them well and put them in the vat, handling them often, say once every two hours the first day, and once each day thereafter, until half tanned, then once every other day until properly tanned. After the hides have been in the handler of liquors or solution four weeks, prepare another vat by putting therein one hundred pounds (100 lbs.) of japonica, and liquor of the same amount, of sumach and chemical the same, and the quantity mentioned in connection with the first vat. Strengthen the said solution once a week by adding twenty-five pounds (25 lbs.) each of sumach and japonica. The hides should be shoved out of the handler. Every time a fresh pack of hides is put in, add half the quantity of each of the ingredients first named. Keep the sumach in soak and the japonica melted ready for use. Strengthen the solution by adding half the quantity of the chemicals above named.

These liquors can be continually used without souring or spoiling. The sal-soda softens both the water and hides; the potash destroys all fatty substances, so that the leather tans better and faster; and the turpentine enhances the penetrating properties of the compound, causing it to penetrate every fiber of the hide. The whole compound acts like a powerful liniment, penetrating the hides quickly, without impairing their strength or nature.

Having thus described our improved compound, what we claim, and desire to secure by Letters Patent, is—

The herein-described compound, consisting of sumach, japonica, salt, sal-soda, oil of vitriol, spirits of turpentine, and potash, substantially as specified.

In testimony that we claim the foregoing as our own we affix our signatures in presence of two witnesses.

ARTHUR HASWELL.
JOHN C. LONG.

Witnesses as to A. HASWELL:
M. SWEENEY,
E. BURGESS.

Witnesses as to signature of JOHN C. LONG:
D. P. LONG,
THOMAS CORBETT.